(12) United States Patent
Hertenstein

(10) Patent No.: US 8,302,008 B2
(45) Date of Patent: Oct. 30, 2012

(54) SOFTWARE APPLICATION FOR PRESENTING FLASH PRESENTATIONS ENCODED IN A FLASH PRESENTATION MARKUP LANGUAGE (FLML)

(75) Inventor: David Hertenstein, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 580 days.

(21) Appl. No.: 12/257,196

(22) Filed: Oct. 23, 2008

(65) Prior Publication Data

US 2010/0107051 A1    Apr. 29, 2010

(51) Int. Cl.
*G06F 3/048* (2006.01)
(52) U.S. Cl. .................. 715/719; 715/704
(58) Field of Classification Search ............. 711/103, 711/E12.008; 715/730, 201–204, 719, 704
See application file for complete search history.

(56) References Cited

U.S. PATENT DOCUMENTS

| | | | | |
|---|---|---|---|---|
| 6,901,403 | B1 * | 5/2005 | Bata et al. ............... | 1/1 |
| 6,910,049 | B2 * | 6/2005 | Fenton et al. ........... | 1/1 |
| 2002/0116716 | A1 * | 8/2002 | Sideman .................. | 725/91 |
| 2003/0037311 | A1 * | 2/2003 | Busfield .................. | 717/115 |
| 2004/0205116 | A1 * | 10/2004 | Pulier et al. ........... | 709/203 |
| 2007/0094609 | A1 * | 4/2007 | Gilboa et al. ........... | 715/762 |

FOREIGN PATENT DOCUMENTS

WO    0223478 A2    3/2002

OTHER PUBLICATIONS

Skavish, Dmitry. The JGenerator. http://www.flashgap.com. 2000. accessed Apr. 14, 2011.*
Gunesch, Moses. The Fuse Kit 2.1. http://mosessupposes.com/Fuse/fuse2docs. Jan. 14, 2007, accessed Apr. 14, 2011.*
Hoff. Netscape Plug-Ins. Linux J. 65es, Article 5. Sep. 1999.*
Meyers. Interactive 3D With Shockwave. Web Techniques, Feb. 2002, vol. 7, Part 2, pp. 39-41.*

* cited by examiner

*Primary Examiner* — Weilun Lo
*Assistant Examiner* — Amy M Levy
(74) *Attorney, Agent, or Firm* — Patents On Demand P.A.; Brian K. Buchheit; Scott M. Garrett

(57) ABSTRACT

A system for presenting FLASH presentations contained in a storage medium. Such a system can include a FLASH presentation (FLAPRE) markup language (FLML) document, a FLASH-based FLAPRE player, and a launching application. The FLML document can textually represent a user-created FLASH presentation using the FLAPRE markup language (FLML). The FLAPRE player can be configured to visually render the user-created FLASH presentation contained within the FLML document. The launching application can be configured to display the FLAPRE player and can support the use of FLASH animation.

13 Claims, 2 Drawing Sheets

SOFTWARE APPLICATION FOR PRESENTING FLASH PRESENTATIONS ENCODED IN A FLASH PRESENTATION MARKUP LANGUAGE (FLML)

BACKGROUND OF THE INVENTION

The present invention relates to the field of FLASH presentation rendering and, more particularly, to a software application for presenting FLASH presentations that are encoded in a FLASH presentation (FLAPRE) markup language (FLML).

FLASH animation is a popular method for creating electronic presentations. Conventionally, FLASH presentations are created using a process that compiles a variety of source files into the final presentation file, which has a .SWF file extension. As such, a variety of software applications exists that are capable of rendering the content and animations of conventionally created FLASH presentations.

However, these software applications are incapable of rendering FLASH presentations that are not created through the conventional process, and, therefore, are not encoded into a .SWF file format. For example, it is possible to represent a FLASH presentation textually using a markup language, such as the FLASH presentation (FLAPRE) markup language (FLML). These conventional software applications would simply reject a FLML document, since it does not have a .SWF extension, even though the FLML document contains a valid FLASH presentation.

BRIEF SUMMARY OF THE INVENTION

One aspect of the present invention can include a system for presenting FLASH presentations contained in a storage medium. Such a system can include a FLASH presentation (FLAPRE) markup language (FLML) document, a FLASH-based FLAPRE player, and a launching application. The FLML document can textually represent a user-created FLASH presentation using the FLAPRE markup language (FLML). The FLAPRE player can be configured to visually render the user-created FLASH presentation contained within the FLML document. The launching application can be configured to display the FLAPRE player and can support the use of FLASH animation.

Another aspect of the present invention can include a method for presenting FLASH presentations. Such a method can begin by accessing a FLASH presentation (FLAPRE) markup language (FLML) document representing a user-created FLASH presentation. The user-created FLASH presentation can contain content elements and format definitions. The FLML document can be translated into code that can be used by a FLASH animation engine. Then, the translated FLML document can be rendered in a display area.

Yet another aspect of the present invention can include a FLASH-based FLASH presentation (FLAPRE) player. The FLAPRE player can include a display area, a FLASH animation engine, and a FLASH presentation (FLAPRE) markup language (FLML) interpreter. The display area can be configured to visually present a user-created FLASH presentation. The user-created FLASH presentation can be expressed using a FLML in a FLML document. The FLASH animation engine can be configured to graphically animate the user-created FLASH presentation within the display area. The FLML interpreter can be configured to translate the FLML document into code usable by the FLASH animation engine in a run-time environment.

An additional aspect of the present invention can include a computer program product for presenting FLASH presentations that includes a computer readable storage medium containing computer usable program code. The computer usable program code can be configured to access a FLASH presentation (FLAPRE) markup language (FLML) document that represents a user-created FLASH presentation. The user-created FLASH presentation can contain content elements and format definitions. Then, the computer usable program code can be configured to translate the FLML document into code usable by a FLASH animation engine. The computer usable program code can also be configured to render the translated FLML document in a display area.

DETAILED DESCRIPTION OF THE INVENTION

Figure 1:
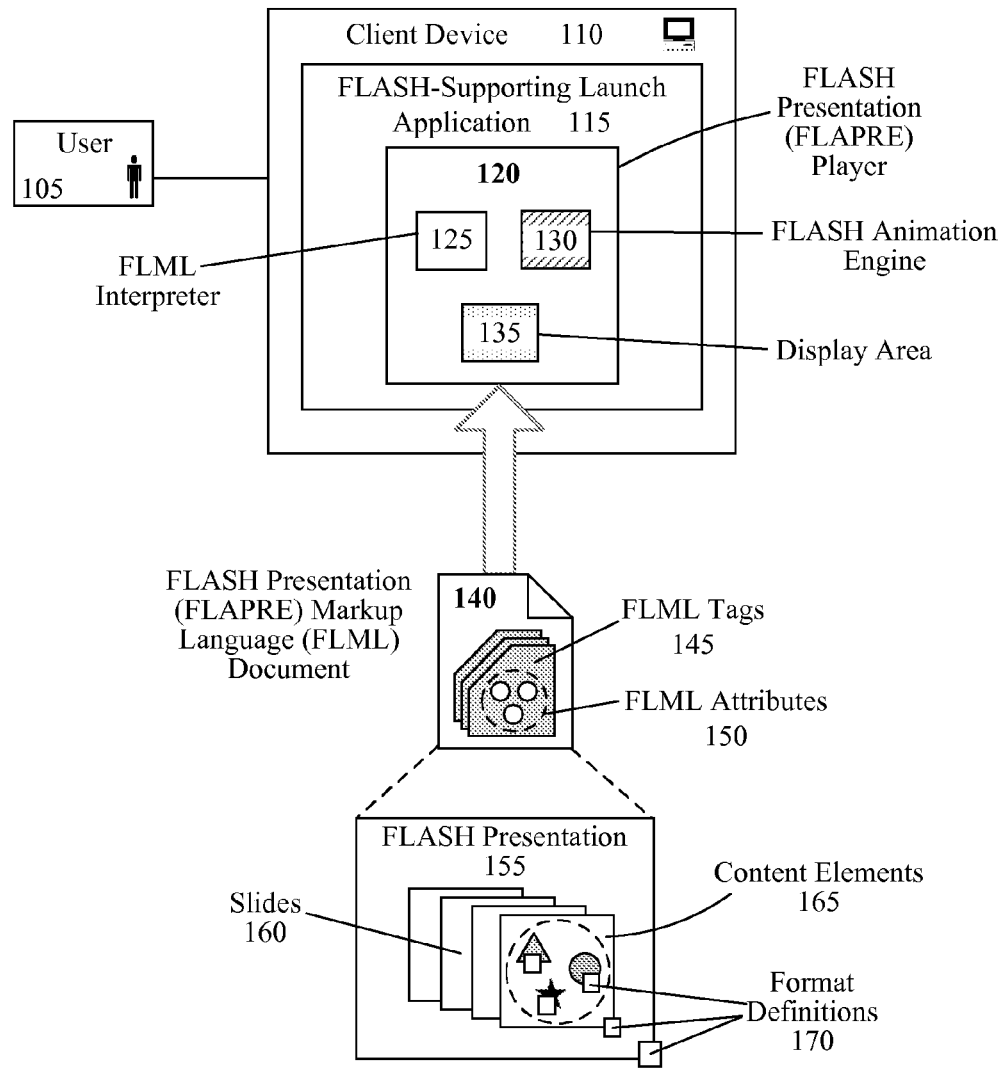
FIG. 1 is a schematic diagram illustrating a system that utilizes a FLASH presentation (FLAPRE) player to render FLASH presentations contained within FLAPRE markup language (FLML) documents in accordance with embodiments of the inventive arrangements disclosed herein.

The present invention discloses a FLASH-based FLASH presentation (FLAPRE) player that can render a FLAPRE markup language (FLML) document containing a FLASH presentation. The FLML document can represent the contents of the FLASH presentation textually using the FLML. The FLAPRE player can utilize an interpreter to translate the FLML into code that can be rendered by a FLASH animation engine. Additionally, the FLAPRE player can validate the structure and/or syntax of the FLML document.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer usable storage medium having computer usable program code embodied in the medium. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. Examples of a computer readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer usable or computer readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a system 100 that utilizes a FLASH presentation (FLAPRE) player 120 to render FLASH presentations 155 contained within FLAPRE markup language (FLML) documents 140 in accordance with embodiments of the inventive arrangements disclosed herein. In system 100, a user 105 can utilize the FLASH presentation (FLAPRE) player 120, herein referred to as the FLAPRE player, operating on a client device 110 to display a FLASH presentation 155.

The FLASH presentation 155 can represent an electronic compilation of one or more slides 160 used to visually present user-entered data. The data contained within the FLASH presentation 155 can be abstractly defined as a collection of various content elements 165, such as images, videos, or text strings. The behavior and/or appearance qualities of the content elements 165 can be conceptualized as format definitions 170 associated with the content elements 165. Format definitions can also be created for the overall FLASH presentation 155 and/or individual slides 160.

The data associated with the content elements 165 and format definitions 170 can be captured within a FLML document 140. The FLML document 140 can be an electronic document that textually represents the FLASH presentation 140 using FLML tags 145 and FLML attributes 150 of FLML as defined in U.S. patent application Ser. No. 12/257,130 filed 23 Oct. 2008 and incorporated herein by reference. The FLML tags 145 and FLML attributes 150 can be text strings based upon a standardized markup language, such as an Extensible Markup Language (XML).

The FLAPRE player 120 can access the tags 145 and attributes 150 of the FLML document 140 in order to render the FLASH presentation 155. The FLAPRE player 120 can represent a FLASH application configured to graphically render FLASH presentations 155 that are expressed within FLML documents 140. Additionally, the FLAPRE player 120 can perform a variety of validation operations upon the FLML document 140 prior to rendering the FLASH presentation 155.

It should be noted that, due to the disparate nature of conventionally encoded FLASH presentations 155 in a .SWF file and those encoded with FLML, the FLAPRE player 120 is unable to render conventionally encoded FLASH presentations 155. That is, the FLAPRE player 120 cannot render FLASH presentations 155 contained within .SWF files.

Additionally, it should be noted that the FLML allows the reference of external files for FLASH presentation content. As such, the data contained in external files that are referenced in the FLML document 140 can be efficiently handled by the FLAPRE player 120 by loading the data of the external files on an as-needed basis. That is, all external files referenced in the FLML document 140 are only accessed when the corresponding FLML reference is executed. Therefore, this approach can incur a minimal amount of operating overhead for the rendering of the FLASH presentation 155 by the FLAPRE player 120.

To render the FLML document 140, the FLAPRE player 120 can include a FLML interpreter 125, a FLASH animation engine 130, and display area 135. The FLML interpreter 125 can represent a software component of the FLAPRE player 120 configured to decode the FLML tags 145 and FLML attributes 150 of the FLML document 140 for use by the FLASH animation engine 130.

The FLASH animation engine 130 can represent a software component of the FLAPRE player 120 that can be configured to provide FLASH animation based on the input of the FLML interpreter 125. For example, the FLML interpreter 125 can translate the tags 145 and attributes 150 of the FLML document 140 into ACTIONSCRIPT code that can be used by the FUSE KIT animation engine 130. The animation of the FLASH presentation 155 can be viewed by the user 105 within the display area 135.

The FLAPRE player 120 can be executed within the FLASH-supporting launch application 115 running on the client device 110. The client device 110 can represent a variety of electronic computing devices capable of executing the FLASH-supporting launch application 115. The FLASH-supporting launch application 115 can represent a software application capable of executing a FLASH file. For example, the FLASH-supporting launch application 115 can be a Web browser having an embedded FLASH PLAYER component. Alternately, the FLASH-supporting launch application 115 can be an independent software application, such as the ADOBE FLASH PLAYER.

In an alternate embodiment, the FLAPRE player 120 can be an embedded component of another software application (not shown). For example, the FLAPRE player 120 can provide the preview capability for the FLAPRE authoring tool of U.S. patent Ser. No. 12/256,946 filed 23 Oct. 2008 and incorporated herein by reference. In such an embodiment, the umbrella software application can also provide the functionality of the FLASH-supporting launch application 115.

Figure 2:
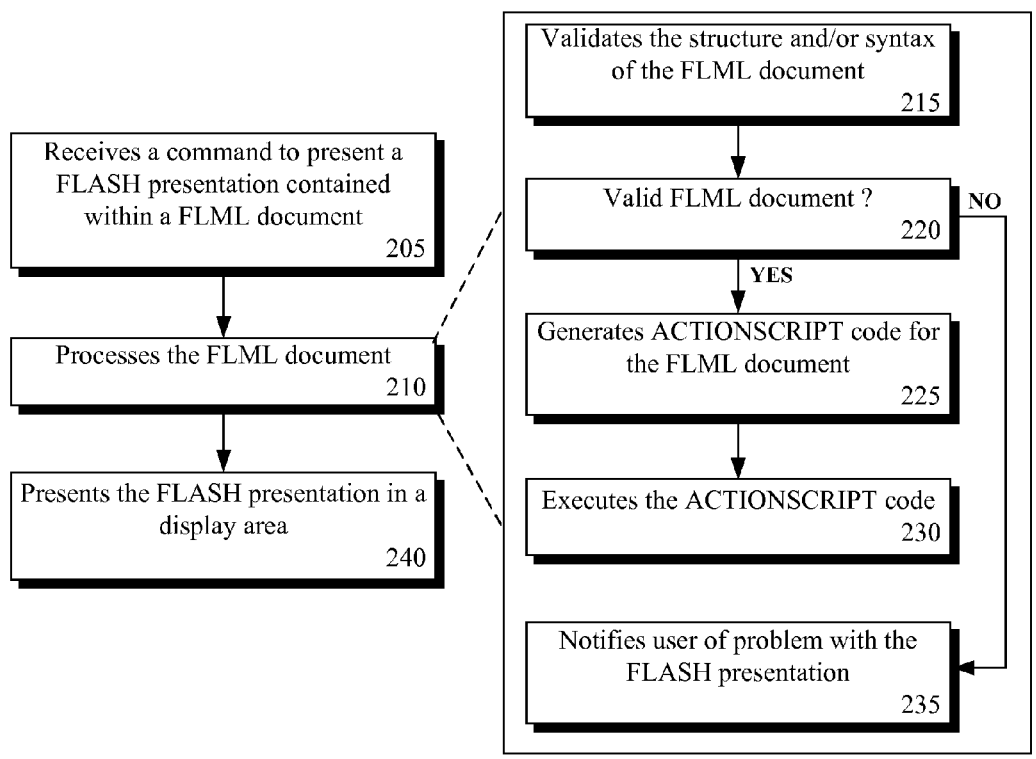
FIG. 2 is a flow chart of a method for rendering a FLASH presentation written in the FLASH presentation (FLAPRE) markup language (FLML) using the FLAPRE player in accordance with an embodiment of the inventive arrangements disclosed herein.

FIG. 2 is a flow chart of a method 200 for rendering a FLASH presentation written in the FLASH presentation (FLAPRE) markup language (FLML) using the FLAPRE player in accordance with an embodiment of the inventive arrangements disclosed herein. Method 200 can be performed in the context of system 100.

Method 200 can begin with step 205 where the FLAPRE player can receive a command to present a FLASH presentation contained within a FLML document. In step 210, the FLAPRE player can process the FLML document. Processing of the FLML document can include step 215 where the FLAPRE player can validate the structure and/or syntax of the FLML document.

In step 220, it can be determined if the FLML document is valid. When the FLML document is invalid, the user can be notified that there is a problem with the FLASH presentation in step 235. When the FLML document is valid, then step 225 can execute where the FLAPRE player can generate ACTIONSCRIPT code for the FLML document. The generated ACTIONSCRIPT code can be executed in step 230.

After processing of the FLML document is complete, step 240 can execute where the FLASH presentation is presented within a display area.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for presenting FLASH presentations comprising:
   accessing a FLASH presentation (FLAPRE) markup language (FLML) document representing a user-created FLASH presentation, wherein the user-created FLASH presentation comprises at least a plurality of content elements and format definitions;
   translating the FLML document into code usable by a FLASH animation engine, wherein the translating of the FLML document comprises validating the FLML document against a predefined document model; and rendering the translated FLML document in a display area, wherein FLASH refers to a format in conformance with the ADOBE FLASH specification as it existed at a time of this disclosure's filing, wherein the accessing, translating, and rendering of the FLML document is performed by a FLAPRE player, wherein the FLAPRE player is a FLASH software application, wherein the FLAPRE player is FLASH BASED and cannot render a FLASH presentation encoded within a .SWF file, wherein the rendering of the translated FLML document further comprises:

determining a need to render a content element of the FLASH presentation, wherein data associated with said content element is contained in an electronic file external to and separate from the FLML document, wherein a location of the electronic file is defined within the FLML document; and accessing the data of the electronic file in real-time and in response to the determined need.

2. The method of claim 1, wherein the code generated by the translation of the FLML document is ACTIONSCRIPT code, wherein the ACTIONSCRIPT code is utilized by the FLASH animation engine for the rendering of the FLML document, wherein ACTIONSCRIPT refers to a format as it existed at a time of this disclosure's filing.

3. The method of claim 1, wherein the translating of the FLML document is performed by a FLML interpreter.

4. The method of claim 1, wherein the FLML document is based upon an Extensible Markup Language (XML).

5. The method of claim 1, wherein the rendering of the translated FLML document is performed by a FLASH animation engine.

6. The method of claim 5, wherein the FLASH animation engine utilizes a FUSE KIT software application, wherein FUSE KIT refers to a format as it existed at a time of this disclosure's filing.

7. A computer program product for presenting FLASH presentations comprising a non-transitory computer readable storage medium having computer usable program code embodied therewith, the computer usable program code comprising:

computer usable program code configured to access a FLASH presentation (FLAPRE) markup language (FLML) document representing a user-created FLASH presentation, wherein the user-created FLASH presentation comprises at least a plurality of content elements and format definitions;

computer usable program code configured to translate the FLML document into code usable by a FLASH animation engine, wherein the translating of the FLML document comprises computer usable program code configured to validate the FLML document against a predefined document model; and computer usable program code configured to render the translated FLML document in a display area, wherein FLASH refers to a format in conformance with the ADOBE FLASH specification as it existed at a time of this disclosure's filing, wherein the accessing, translating, and rendering of the FLML document is performed by a FLAPRE player, wherein the FLAPRE player is a FLASH software application, wherein the FLAPRE player is FLASH BASED and cannot render a FLASH presentation encoded within a .SWF file, wherein the computer usable program code configured to render of the translated FLML document further comprises computer usable program code configured to:

determine a need to render a content element of the FLASH presentation, wherein data associated with said content element is contained in an electronic file external to and separate from the FLML document, wherein a location of the electronic file is defined within the FLML document; and access the data of the electronic file in real-time and in response to the determined need.

8. A computer system comprising:

one or more processors and one or more computer-readable, non-transitory storage devices;

program instructions, stored on at least one of the one or more storage devices for execution by at least one of the one or more processors via at least one of the one or more memories, to access a FLASH presentation (FLAPRE) markup language (FLML) document representing a user-created FLASH presentation, wherein the user-created FLASH presentation comprises at least a plurality of content elements and format definitions;

program instructions, stored on at least one of the one or more storage devices for execution by at least one of the one or more processors via at least one of the one or more memories, to translate the FLML document into code usable by a FLASH animation engine, wherein the translating of the FLML document comprises validating the FLML document against a predefined document model; and program instructions, stored on at least one of the one or more storage devices for execution by at least one of the one or more processors via at least one of the one or more memories, to render the translated FLML document in a display area, wherein FLASH refers to a format in conformance with the ADOBE FLASH specification as it existed at a time of this disclosure's filing, wherein the accessing, translating, and rendering of the FLML document is performed by a FLAPRE player, wherein the FLAPRE player is a FLASH software application, wherein the FLAPRE player is FLASH BASED and cannot render a FLASH presentation encoded within a .SWF file wherein the program instructions to render the translated FLML document further comprises program instructions to:

determine a need to render a content element of the FLASH presentation, wherein data associated with said content element is contained in an electronic file external to and separate from the FLML document, wherein a location of the electronic file is defined within the FLML document; and access the data of the electronic file in real-time and in response to the determined need.

9. The system, of claim 8, wherein the code generated by the translation of the FLML document is ACTIONSCRIPT code, wherein the ACTIONSCRIPT code is utilized by the FLASH animation engine for the rendering of the FLML document, wherein ACTIONSCRIPT refers to a format as it existed at a time of this disclosure's filing.

10. The system of claim 8, wherein the translating of the FLML document is performed by a FLML interpreter.

11. The system of claim 8, wherein the FLML document is based upon an Extensible Markup Language (XML).

12. The system of claim 8, wherein the rendering of the translated FLML document is performed by a FLASH animation engine.

13. The system of claim 12, wherein the FLASH animation engine utilizes a FUSE KIT software application, wherein FUSE KIT refers to a format as it existed at a time of this disclosure's filing.

* * * * *